Patented July 12, 1949

2,476,092

UNITED STATES PATENT OFFICE 2,476,092

COCOA MANUFACTURE

Harry M. Hinteman, Jersey City, N. J., assignor of fifty per cent to Hiram Ricker and Sons, Poland Spring, Maine, a corporation of Maine, twenty-four per cent to Harold E. Jones, Cambridge, Mass., one per cent to Frank T. Cotter and one per cent to G. Edward Cotter, both of New York, N. Y.

No Drawing. Application May 18, 1945,
Serial No. 594,584

3 Claims. (Cl. 99—26)

This invention relates to new and useful improvements in cocoa manufacture. This application is a continuation-in-part of my application Serial No. 453,555, filed August 4, 1942, now abandoned.

The customary cocoa or chocolate dessert, candy, beverage or the like is produced by cooking, boiling or brewing cocoa powder in water. This is true whether the drink is consumed hot or cold, for chocolate syrup used in the making of cold drinks is cocoa and sugar boiled into a syrup. Heretofore, chocolate suitable for mixing with cold liquids was made by dehydrating boiled cocoa.

The object of the present invention is to produce a cocoa powder from which a palatable and healthful drink or other food can be compounded without passing through a stage of cooking, boiling or brewing in hot liquid. My roasted but otherwise raw cocoa, i. e., cocoa powder which has previously been cooked, boiled or brewed in hot liquid, may be stirred into cold water or milk to make a drink or syrup; it can be added dry to an ice cream mix, etc.

The cocoa powder is produced in the following manner:

The cacao beans are first roasted for about half the customary time and then shelled in the usual manner. For instance, where customarily thirty minutes' roasting would be required in a stationary roaster, I roast for only about fifteen minutes.

The partly roasted nibs are prepared for a second roasting, i. e., heat treatment. For this purpose they are loaded, e. g., into a roaster having a closed rotatable cylinder. While the paddles customarily provided in such roasting cylinders are working, but before the heat is applied again, a solution is poured into the cylinder on the nibs. It is an important feature of my process that the nibs be permitted to soak up the solution for a short period of time, of the order of one-half hour, before the second heating is started.

In the usual Dutch roasting process, alkalizing takes place in a separate container and is continued usually until fermentation starts. The nibs become so thoroughly saturated with the alkalizing solution that, when taken out of the alkalizing vat, they must be first dried before being placed in the cylinder for the second roasting.

As distinguished from such alkalizing Dutch process, I place the nibs directly into the cylinder of the roaster and there apply a solution for the short period of one-half hour or so. As will be brought out below, the second heating is started with the solution in the cylinder. The nibs are not removed from the solution and they are, of course, not dried before the second heating is started.

The solution which I have found satisfactory is more than an alkalizing solution. For a batch of four hundred pounds of cacao nibs I use an alkalizing substance such as eight pounds of monohydrated crystals of sodium carbonate dissolved in twenty-four quarts of hot water.

However, in accordance with the important feature of the invention, I add to the solution a substance having an acid reaction as well as certain specific inherent chemical properties. Good results were obtained by adding twelve to sixteen ounces of sodium potassium tartrate (Rochelle salts) as the particular reactive substance of this invention. All or part of the Rochelle salts may be replaced by tartaric acid, argols, or potassium bitartrate. Part of any one of the three substances containing the tartrate radical may be used.

The above-mentioned substances may be added to the solution on a chemical equivalent basis since they react probably as acids, or acid salts, on the basis of the valence of the tartaric product.

The roasting and alkalizing alone, nor their combination, will produce the novel result that I obtained by the addition of a substance having a tartrate and/or a tartrate-like reacting radical.

I have found that when any of the above-mentioned substances was added to the solution, then the final product had the characteristic odor and taste which are customarily produced by tartrates, and the cocoa or chocolate made from the product had the characteristic new taste above referred to.

In the claims I shall refer to all the above-mentioned substances that are added to the solution as tartrate reacting substances, be they straight salts, acid salts, or acids. It is possible, of course, that a substance might be found that is not scientifically classified as a tartrate but which will give this same tartrate-like reaction and still produce my improved cocoa or chocolate products.

After they have imbibed the solution for about one-half hour as above stated, the nibs are heated for a period of the order of one and one-half to two hours without removal from the solution. The length of this second heating operation varies with the quality of the cacao beans used and with the color desired for the final product. Care should, of course, be exercised to control the heat so as to prevent burning of the beans.

It is impossible to specify temperatures because those depend on the fuel employed, the quality of the nibs and on other variables. Any one skilled in the art would know how to vary these. The temperature should first be raised to a level sufficient to steam the nibs, i. e., to remove moisture without hardening the outer skin of the nib. Once the nibs are fairly dry, e. g., when ninety-five percent of the moisture has been removed, then the heat is gradually reduced and the heating continued until the nibs are uniform throughout their bodies.

Throughout this second heat treatment the cylinder is revolved and the paddles are operated.

After the second heating the cacao nibs are treated in the same manner as is well known in the art, to make my improved cocoa or chocolate products.

The chocolate flavor of the product is permanently intensified by my process to such an extent that no foreign flavoring such as the customary vanilla need be added.

The cocoa powder is not as bitter as that produced with the Dutch "alkalizing" processes and, therefore, needs less sugar and other flavoring when used in making cocoa and chocolate drinks, ice cream, desserts, etc.

The flavor of finer cacao beans, such as are found in South America, is brought out much more than was heretofore possible.

Possibly on account of the alterations of the carbohydrates during the second heat treating which affects all parts of the cacao nib, no further special processing, e. g., brewing or boiling, is needed with my improved product. The great improvement in taste may be due to chemical reactions that take place during the second heating. I have not sufficiently investigated all reactions and am not well enough versed in the scientific principles involved more fully to elucidate them. The fact is that cocoa powder produced as above described need not be boiled at all nor brewed in hot water, but can be stirred into cold water or milk to produce a palatable, healthful drink. The chocolate liquid after it has been sweetened and rolled need not be conchared (rolled on stones while subjected to heat) for the usual long periods of time but can be poured direct into the molds. The dry cocoa powder can be added direct to an ice cream mix at the freezer head to make chocolate ice cream, and it can be mixed with cold water to produce a syrup, etc.

The cocoa powder processed in accordance with my invention may also be stirred into boiling water or brewed in a hot liquid without losing flavor. This makes possible its use in cooked desserts in the same manner as the customary cocoa powder; and the flavor of the dessert will be fully preserved whereas with the customary cocoa the cooking changes the flavor, and special flavoring, e. g., vanilla, must be added. However, as distinguished from prior cocoas, the taste of a drink or a syrup made with my cocoa will be the same irrespective of the temperature of the liquid in which it is brewed. Furthermore, the improved characteristics of my new cocoa eliminate excessive sediment and the objectionable scumming film found in hot cocoa drinks.

What I claim is:

1. The process of preparing cocoa which comprises the following steps: partially roasting and then shelling the cocoa beans, introducing the partially roasted nibs and a solution into a roasting cylinder, stirring the nibs and solution for about one-half hour, said solution being prepared for a batch of four hundred pounds of nibs by dissolving eight pounds of monohydrated crystals of sodium carbonate and twelve to sixteen ounces of sodium potassium tartrate in twenty-four quarts of hot water, then subjecting the nibs to a second roasting for a period of one and one-half to two hours by first raising the temperature to drive out approximately ninety-five percent of the moisture, and then gradually reducing the temperature until the nibs are completely roasted.

2. The process of preparing cocoa which comprises the following steps: partially roasting and then shelling the cacao beans, loading the partially roasted nibs into a closed cylinder, stirring the nibs for about one-half hour in an alkalizing solution containing sodium carbonate and sodium potassium tartrate, then subjecting the nibs to a second roasting for a period of one and one-half to two hours.

3. The process of preparing cocoa which comprises the following steps: partially roasting and then shelling the cacao beans, loading the partially roasted nibs into a closed cylinder, stirring the nibs for about one-half hour in an alkalizing solution prepared for a batch of four hundred pounds of nibs by dissolving eight pounds of monohydrated crystals of sodium carbonate and twelve to sixteen ounces of sodium potassium tartrate in twenty-four quarts of hot water, then subjecting the nibs to a second roasting for a period of one and one-half to two hours by first raising them to a high temperature to drive out approximately ninety-five percent of the moisture, and then gradually reducing the temperature until the nibs are completely roasted.

HARRY M. HINTEMAN.

REFERENCES CITED

The following references are of record in the file of this patent:

UNITED STATES PATENTS

| Number | Name | Date |
|---|---|---|
| 1,862,166 | Steely | June 7, 1932 |
| 2,397,402 | Benedict | Mar. 26, 1946 |

FOREIGN PATENTS

| Number | Country | Date |
|---|---|---|
| 6,105 | Great Britain | 1912 |
| 14,519 | Great Britain | 1900 |

OTHER REFERENCES

Cocoa and Chocolate, by Whymper, 1912, pages 105 to 106.

Certificate of Correction

Patent No. 2,476,092.                                                                 July 12, 1949.

HARRY M. HINTEMAN

It is hereby certified that error appears in the printed specification of the above numbered patent requiring correction as follows:

Column 1, line 21, after the word "has" insert *not*;

and that the said Letters Patent should be read with this correction therein that the same may conform to the record of the case in the Patent Office.

Signed and sealed this 29th day of November, A. D. 1949.

[SEAL]

THOMAS F. MURPHY,
*Assistant Commissioner of Patents.*